US012612188B2

(12) United States Patent
Wang et al.

(10) Patent No.: US 12,612,188 B2
(45) Date of Patent: Apr. 28, 2026

(54) CONE SEGMENT STRUCTURE OF FAIRING WITH TWO-HALF HOOD STRUCTURES HAVING METAL BARS MADE IN A VON KARMAN CURVE SHAPE

(71) Applicant: Lightyear Exploration (Jiangsu) Space Technology Co., Ltd., Suzhou (CN)

(72) Inventors: Lipeng Wang, Beijing (CN); Chengye Li, Beijing (CN); Zhongyi Liu, Chengdu (CN); Chenlong Liu, Shenyang (CN)

(73) Assignee: Lightyear Exploration (Jiangsu) Space Technology Co., Ltd., Suzhou (CN)

(*) Notice: Subject to any disclaimer, the term of this patent is extended or adjusted under 35 U.S.C. 154(b) by 0 days.

(21) Appl. No.: 18/774,187

(22) Filed: Jul. 16, 2024

(65) Prior Publication Data

US 2026/0021908 A1 Jan. 22, 2026

(51) Int. Cl.
B64G 1/22 (2006.01)
(52) U.S. Cl.
CPC ...................................... B64G 1/22 (2013.01)
(58) Field of Classification Search
CPC .................................................... B64C 1/0683
See application file for complete search history.

(56) References Cited

U.S. PATENT DOCUMENTS

| 3,236,476 | A | * | 2/1966 | White | B64G 1/58 |
| | | | | | 62/239 |
| 5,743,492 | A | * | 4/1998 | Chan | B64G 1/642 |
| | | | | | 102/378 |
| 2016/0325857 | A1 | * | 11/2016 | Brewer | B29C 65/4835 |

FOREIGN PATENT DOCUMENTS

| CN | 109625338 | A | * | 4/2019 | ............ | B64G 1/645 |
| CN | 111717421 | A | * | 9/2020 | ............ | B64G 1/52 |
| CN | 111717422 | A | * | 9/2020 | ............ | B64G 1/52 |
| CN | 115535298 | A | * | 12/2022 | ............ | B64G 1/22 |
| CN | 116424543 | A | * | 7/2023 | ............ | B64C 1/38 |
| CN | 117682105 | A | * | 3/2024 | ............ | B64G 1/10 |

* cited by examiner

*Primary Examiner* — Arfan Y. Sinaki
(74) *Attorney, Agent, or Firm* — Yuhao Liang

(57) ABSTRACT

A cone segment structure of the fairing includes two half-hood structures, the two half-hood structures are both composed of a plurality of bus metal bars and a plurality of loop metal bars that are sequentially connected in an intersected mode, each of the bus metal bars is made in a Von Karman curve shape by adopting a stretch bending mode, the two half-hood structures form a hood with a Von Karman cone segment structure, the hood is covered with a skin, and a top end of the hood is provided with an end cap.

5 Claims, 5 Drawing Sheets

CONE SEGMENT STRUCTURE OF FAIRING WITH TWO-HALF HOOD STRUCTURES HAVING METAL BARS MADE IN A VON KARMAN CURVE SHAPE

TECHNICAL FIELD

The present invention relates to the technical field of fairings, and specifically relates to a cone segment structure of a fairing.

BACKGROUND ART

A fairing with a Von Karman cone segment is in a form of fairing with smallest wind resistance, but the Von Karman cone segment has a spatial three-dimensional curved surface structure, requires a large mold and can only be manufactured by a composite material. The material, the mold and a process have extremely high costs, causing the manufacturing cost of the fairing with the Von Karman cone segment to be much higher than that of other configurations of fairings.

Due to requirements for wave transmission performance of the fairing, lightweight and high-strength materials are difficult to be applied in the cone segment of the fairing, and materials with good wave transmission performance and glass fiber reinforced plastic foam sandwich structures have unsatisfactory specific stiffness and specific strength, resulting in heavier structures.

With continuous development of aerospace technologies, requirements for fine aerospace design are getting higher and higher, satellite loads have increasingly higher requirements for the comfort and comfortableness of a carrying environment, and requirements for noise reduction, heat insulation and wave transmission performance are thus getting higher and higher. How to improve the requirements of comfort and functionality of the fairing on the basis of achieving a light weight and a low cost has become a difficulty and a development trend in design and manufacturing of fairing structures.

The prior art discloses a bearing and noise-reducing integrated rocket fairing. The fairing can not only achieve the mechanical bearing capacity, but also greatly improve sound insulation, thereby providing a comfortable acoustic environment for a payload in a rocket. However, the technical solution disclosed in the patent still has at least the following problems: a honeycomb sandwich core in the technical solution is difficult to make and has a high material cost, moreover, time and labor are greatly consumed when the Von Karman cone segment is made from a special fabric by a sequential stacking mode in preparation of existing skins, and the wave transmission performance of the fairing will also be affected.

SUMMARY OF THE INVENTION

The purpose of the present invention is to provide a cone segment structure of a fairing. The cone segment structure of the fairing can be simply manufactured, is low in cost, and can effectively improve wave transmission performance.

Embodiments of the present invention are implemented as follows:

An embodiment of the present application provides a cone segment structure of a fairing, comprising two half-hood structures, wherein the two half-hood structures are both composed of a plurality of bus metal bars and a plurality of loop metal bars that are sequentially connected in an intersected mode, each of the bus metal bars is made in a Von Karman curve shape by adopting a stretch bending mode, the two half-hood structures form a hood with a Von Karman cone segment structure, the hood is covered with a skin, and a top end of the hood is provided with an end cap.

In some embodiments of the present invention, outer surfaces of the end cap and the skin are both covered with an external heat insulation layer.

In some embodiments of the present invention, the external heat insulation layer comprises a cork structure.

In some embodiments of the present invention, the external heat insulation layer comprises a sprayed heat insulation structure.

In some embodiments of the present invention, the skin is curved fireproof wooden plywood.

In some embodiments of the present invention, a heat insulation plate is provided between the end cap and the hood.

In some embodiments of the present invention, the skin and the hood are connected through bolts.

Compared with the prior art, the embodiments of the present invention at least have the following advantages or beneficial effects.

The present invention provides a cone segment structure of a fairing, comprising two half-hood structures. The two half-hood structures form an overall structure of the fairing. The two half-hood structures are both composed of a plurality of bus metal bars and a plurality of loop metal bars that are sequentially connected in an intersected mode, each of the bus metal bars is made in a Von Karman curve shape by a stretch bending mode, the two half-hood structures form a hood with a Von Karman cone segment structure, the hood is covered with a skin, and a top end of the hood is provided with an end cap. After the plurality of bus metal bars and the plurality of loop metal bars are connected in the intersected mode, the bus metal bars are made in the Von Karman curve shape by the stretch bending mode, which can form the hood of a Von Karman curved surface. By making the bus metal bars and the loop metal bars in advance according to a Von Karman curve, connecting the bus metal bars and the loop metal bars in the intersected mode and then covering the hood with the skin, a labor cost and a time cost can be effectively reduced, and a material cost can also be reduced. After the hood is covered with the skin, the end cap is provided at the top end of the hood. The end cap can reduce the impact of air resistance caused by a constantly increased launch speed in a rocket launch process. The air resistance will cause airflow impact on a rocket surface, and due to friction and heating, may damage loads in the fairing, such as a satellite and an aircraft. After the end cap and the skin are provided on the hood, the fairing is simple in structure, cheap in material and less in material consumption, and can achieve a low cost without affecting the wave transmission performance.

Therefore, the cone segment structure of the fairing can be easily manufactured, greatly improves manufacturing efficiency, is low in cost, and can effectively improve the wave transmission performance.

BRIEF DESCRIPTION OF THE DRAWINGS

In order to explain the technical solutions of the embodiments of the present invention more clearly, drawings required to be used in the embodiments are briefly introduced below. It should be understood that the following drawings only show some embodiments of the present invention and therefore should not be regarded as limitations of the scope. For persons of ordinary skill in the art, other relevant drawings can also be obtained without exerting creative efforts according to these drawings.

Figure 1:
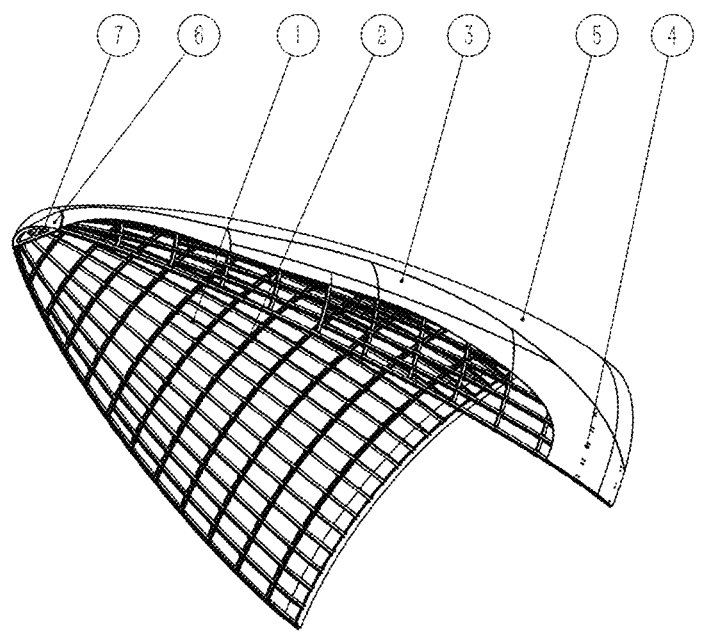
FIG. 1 is a structural schematic diagram of a half-hood structure in an embodiment of the present invention.

Callouts are as follows: 1—bus metal bar, 2—loop metal bar, 3—skin, 4—bolt, 5—external heat insulation layer, 6—end cap, 7—heat insulation plate.

DETAILED DESCRIPTION OF EMBODIMENTS

In order to make the purpose, technical solutions and advantages of the embodiments of the present invention clearer, the technical solutions in the embodiments of the present invention are described clearly and completely below in conjunction with the drawings in the embodiments of the present invention. Obviously, the described embodiments are only a part of the embodiments of the present invention, rather than all of the embodiments. Components in the embodiments of the present invention generally described and illustrated in the drawings herein may be arranged and designed in a variety of different configurations.

Therefore, the following detailed description of the embodiments of the present invention provided in the drawings is not intended to limit the scope of the present invention claimed for protection, but only shows selected embodiments of the present invention. On the basis of the embodiments of the present invention, all other embodiments obtained by persons of ordinary skill in the art without exerting creative efforts should fall within the scope of protection of the present invention.

Embodiment

Figure 2:
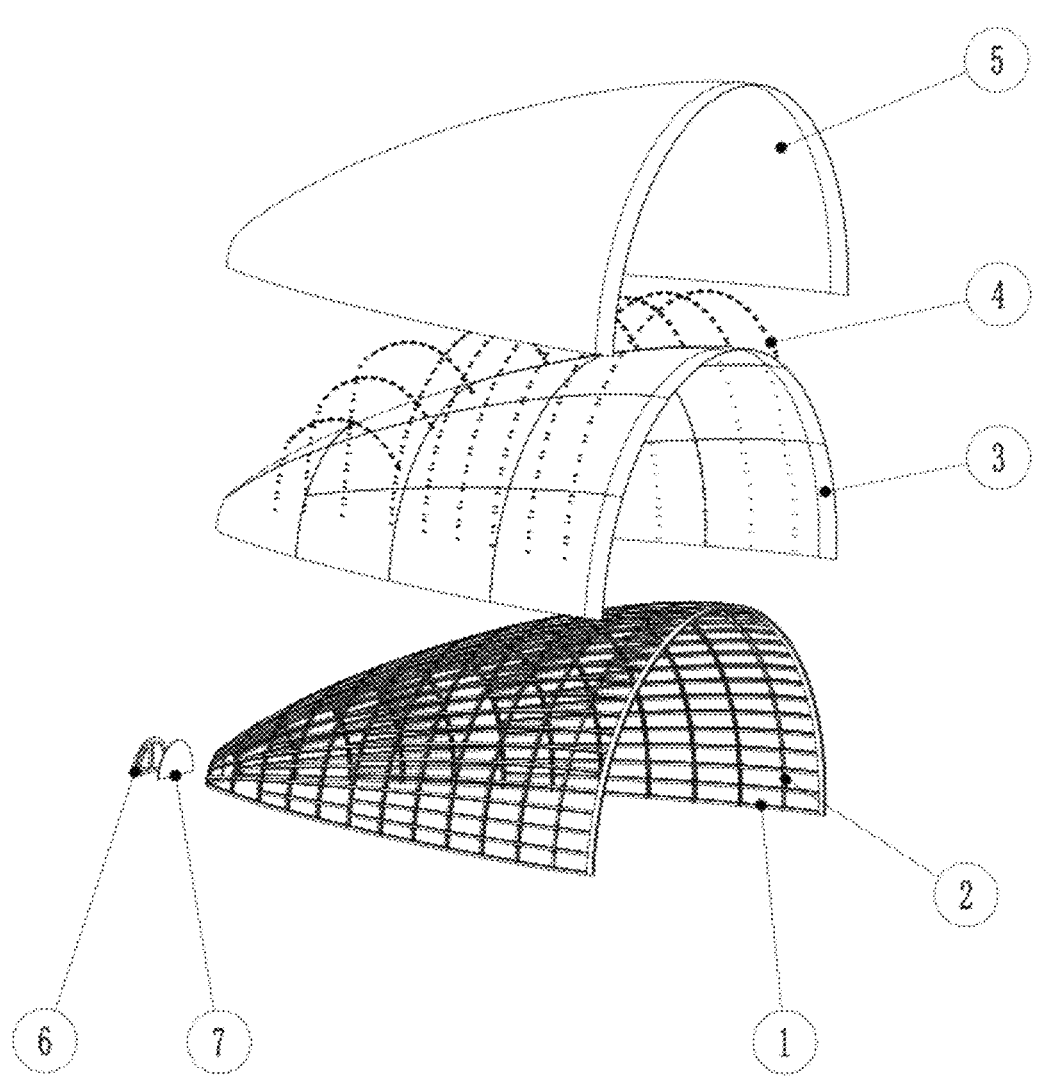
FIG. 2 is a three-dimensional exploded structural schematic diagram of the half-hood structure in the embodiment of the present invention.
Figure 3:
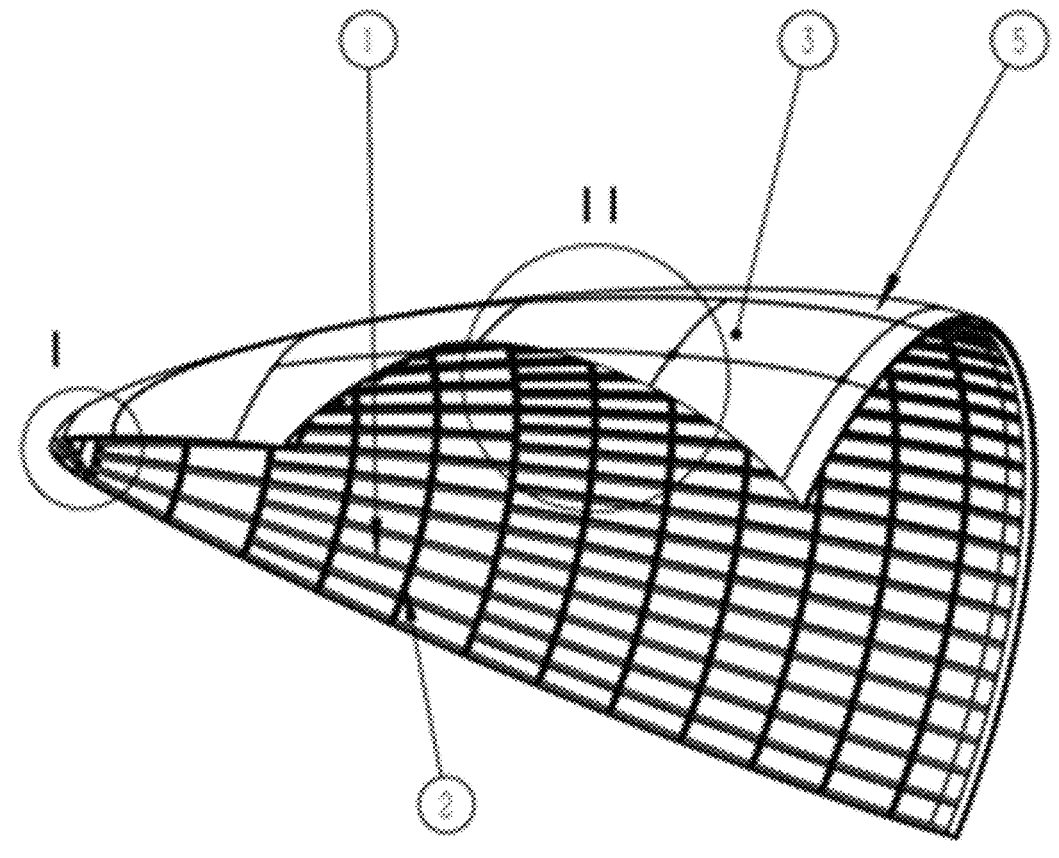
FIG. 3 is a three-dimensional sectional partial view of the half-hood structure in the embodiment of the present invention.
Figure 4:
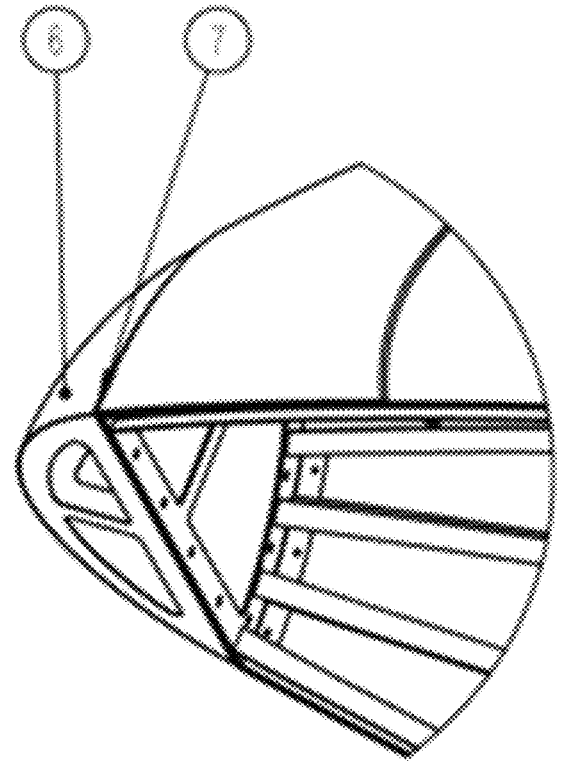
FIG. 4 is an enlarged view at I in FIG. 3.
Figure 5:
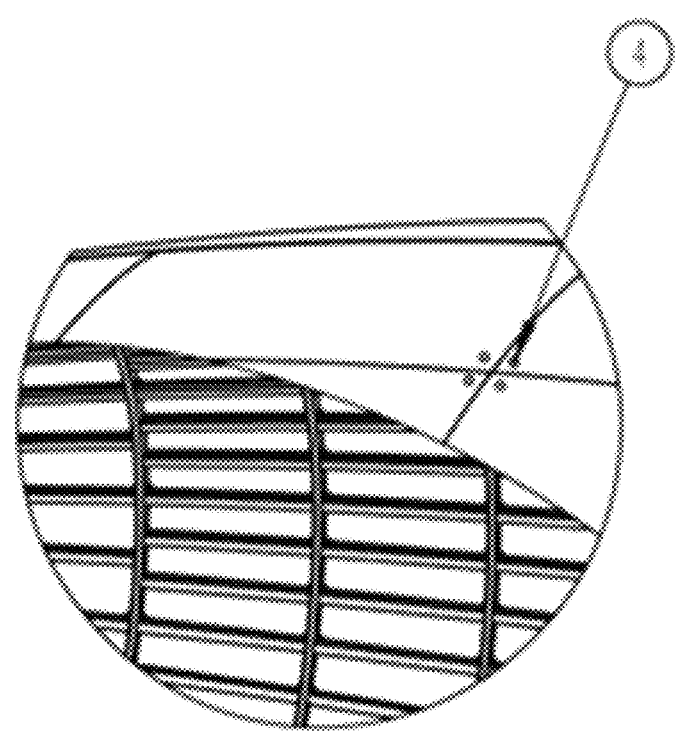
FIG. 5 is an enlarged view at II in FIG. 3.

Please refer to FIG. 1 to FIG. 5, FIG. 1 is a structural schematic diagram of a half-hood structure in an embodiment of the present invention; FIG. 2 is a three-dimensional exploded structural schematic diagram of the half-hood structure in the embodiment of the present invention; FIG. 3 is a three-dimensional sectional partial view of the half-hood structure in the embodiment of the present invention; FIG. 4 is an enlarged view at I in FIG. 3; and FIG. 5 is an enlarged view at II in FIG. 3. The embodiment provides a cone segment structure of a fairing, comprising two half-hood structures. The two half-hood structures form an overall structure of the fairing. The two half-hood structures are both composed of a plurality of bus metal bars 1 and a plurality of loop metal bars 2 that are sequentially connected in an intersected mode, each of the bus metal bars 1 is made in a Von Karman curve shape by a stretch bending mode, the two half-hood structures form a hood with a Von Karman cone segment structure, the hood is covered with a skin 3, and a top end of the hood is provided with an end cap 6.

After the plurality of bus metal bars 1 and the plurality of loop metal bars 2 are connected in the intersected mode, the bus metal bars 1 are made in the Von Karman curve shape by the stretch bending mode, which can form the hood of a Von Karman curved surface. By making the bus metal bars 1 and the loop metal bars 2 in advance according to a Von Karman curve, connecting the bars in the intersected mode and then covering the hood with the skin 3, a labor cost and a time cost can be effectively reduced, and a material cost can also be reduced. After the hood is covered with the skin 3, the end cap 6 is provided at the top end of the hood. The end cap 6 can reduce the impact of air resistance caused by a constantly increased launch speed in a rocket launch process. The air resistance will cause airflow impact on a rocket surface, and due to friction and heating, may damage loads in the fairing, such as a satellite and an aircraft. After the end cap 6 and the skin 3 are provided on the hood, the fairing is simple in structure, cheap in material and less in material consumption, and can achieve a low cost without affecting the wave transmission performance. Therefore, the cone segment structure of the fairing can be easily manufactured, greatly improves manufacturing efficiency, is low in cost, and can effectively improve the wave transmission performance.

In some implementations of the embodiment, outer surfaces of the end cap 6 and the skin 3 are both covered with an external heat insulation layer 5. The external heat insulation layer 5 is used for preventing an aerodynamic heat flow.

In some implementations of the embodiment, the external heat insulation layer 5 comprises a cork structure. The use of the cork structure for the external heat insulation layer 5 can reduce weight and save materials. Meanwhile, good wave transmission performance is achieved.

In some implementations of the embodiment, the external heat insulation layer 5 comprises a sprayed heat insulation structure. The external heat insulation layer 5 can also adopt a sprayed heat insulation structure. The sprayed heat insulation structure is a heat insulation layer formed by a spraying mode. The structure is made from a spraying material and has a heat insulation property. The spraying mode can be applied conveniently, and can form a good heat insulation effect, improve thermal insulation performance of the structure and reduce energy waste.

In some implementations of the embodiment, the skin 3 is curved fireproof wooden plywood. The curved fireproof wooden plywood is specially designed plywood that has fireproof performance and can adapt to a curved surface shape. The fireproof performance of the plywood is usually improved by treating wood with a flame retardant or adopting a special fireproof coating. Meanwhile, the plywood can adapt to a curved surface shape due to design and a manufacturing process so as to meet specific needs.

In some implementations of the embodiment, a heat insulation plate 7 is provided between the end cap 6 and the hood. The end cap 6 adopts a thin-walled steel spinning structure, a lower end surface of the end cap 6 is provided with the heat insulation plate 7 for heat insulation, and the heat insulation plate 7 is made of a heat-resistant, heat-insulating and low-density material. The end cap 6 is made of a heat-resistant thin-walled steel material by spinning.

In some implementations of the embodiment, the skin 3 and the hood are connected through bolts 4. When the skin 3 and the hood are connected through the bolts 4, covering and fixation of the skin 3 can be effectively realized. In other embodiments, the skin 3 can also cover the hood by, for example, a riveting mode using rivets.

During use, after the plurality of bus metal bars 1 and the plurality of loop metal bars 2 are connected in an intersected mode, the bus metal bars 1 are made in the Von Karman curve shape by the stretch bending mode, which can form the hood of a Von Karman curved surface. After the hood is covered with the skin 3, the end cap 6 is provided at the top end of the hood. The end cap 6 can reduce the impact of air resistance caused by a constantly increased launch speed in a rocket launch process. The air resistance will cause airflow impact on a rocket surface, and due to friction and heating, may damage loads in the fairing, such as a satellite and an aircraft. After the end cap 6 and the skin 3 are provided on the hood, the fairing is simple in structure, cheap in material and less in material consumption, and can achieve a low cost without affecting the wave transmission performance.

The description above only shows preferred embodiments of the present invention and is not intended to limit the present invention. For persons skilled in the art, the present invention may have various modifications and changes. Any modifications, equivalent substitutions, improvements and the like made within the spirit and principles of the present invention shall be included in the scope of protection of the present invention.

What is claimed is:

1. A cone segment structure of a fairing, the cone segment structure comprising:

a half-hood structure, wherein the half-hood structure comprises a plurality of bus metal bars and a plurality of loop metal bars that are sequentially connected, each of the bus metal bars is made in a Von Karman curve shape, and the half-hood structure is configured to be joined with another half-hood structure to form a hood;

a skin covering an outer surface of the half-hood structure;

an end cap provided on a top end of the half-hood structure; and a heat insulation plate provided between the end cap and the half-hood structure.

2. The cone segment structure of the fairing according to claim 1, wherein outer surfaces of the end cap and the skin are both covered with an external heat insulation layer.

3. The cone segment structure of the fairing according to claim 2, wherein the external heat insulation layer comprises a cork structure.

4. The cone segment structure of the fairing according to claim 2, wherein the external heat insulation layer comprises a sprayed heat insulation structure.

5. The cone segment structure of the fairing according to claim 1, wherein the skin is a curved fireproof wooden plywood.

* * * * *